Jan. 13, 1970 R. J. WRIGHT 3,489,317
APPARATUS FOR ASSISTING MATERIAL FLOW
Filed Nov. 22, 1967 2 Sheets-Sheet 1

INVENTOR.
ROBERT J. WRIGHT
BY JACK L. PRATHER

Jan. 13, 1970     R. J. WRIGHT     3,489,317
APPARATUS FOR ASSISTING MATERIAL FLOW
Filed Nov. 22, 1967     2 Sheets-Sheet 2

INVENTOR.
ROBERT J. WRIGHT
BY JACK L. PRATHER

United States Patent Office 3,489,317
Patented Jan. 13, 1970

3,489,317
APPARATUS FOR ASSISTING MATERIAL FLOW
Robert J. Wright, Allentown, Pa., assignor to
Fuller Company
Filed Nov. 22, 1967, Ser. No. 685,035
Int. Cl. G04c 23/44
U.S. Cl. 222—70                          3 Claims

ABSTRACT OF THE DISCLOSURE

A sonic generating means positioned within a material hopper, particularly a bag type dust collector wherein the filtered fine dust particles are deposited in the hopper for conveyance therefrom, automatically actuated according to a preselected pulse pattern by air pressure so as to direct intermittent blasts of sonic waves downwardly and radially to the region of the hopper outlet to prevent bridging of the material across the hopper outlet.

---

The present invention relates to a means for solving the problem of granular material from bridging or arcing across a hopper outlet as it is being conveyed therefrom, usually by gravity alone, thereby preventing or greatly reducing its outflow from the hopper.

In the past, many types of apparatus and systems for solving this same problem have been developed. All of these known systems use a means for imparting mechanical vibrations or direct vibrations to the material. For example, in the patent to Thomas et al., No. 3,195,775, there is shown a mechanical vibrator fastened to the external walls of the hopper which vibrates the walls of the hopper thus transmitting these vibrations directly to the material. In the patent to Frazel, No. 3,140,016, there is shown an electrical vibrator which vibrates an open mesh fabric cage positioned within the hopper. All of these known systems are considered disadvantageous as compared to the present invention because of their relative complexity and cost among other things.

The present invention provides for a sonic generating means, for example a common vibrating reed type horn, actuated by air pressure or electric energy in accordance with a preselected pulse pattern. The horn is positioned within the region of the hopper by a suitable support means and oriented with respect to the hopper so as to direct downwardly and radially sonic waves of sufficient frequency and amplitude to impart increased motion in the material particles and at the same time vibrate the walls of the hopper, all within the general region of the hopper outlet. It is preferred that the longitudinal axis of the horn be aligned with the centerline of the hopper. However, one of the advantages of the present invention is that the positioning of the horn is not absolutely critical which allows greater flexibility in its use. Other features and advantages will be described in greater detail below.

It is an object of the present invention to provide means for dislodging and/or preventing arcing of material across the outlet of a hopper from which the material is being conveyed.

It is a further object of the present invention to utilize sonic vibrations for imparting increased motion to a flowable material in the region of a hopper outlet from which the material is being conveyed.

It is a further object of the present invention to provide automatic means for preventing clogging of a flowable material across a hopper outlet.

It is a further object of the present invention to prevent clogging of a flowable material in the region of a hopper outlet, by means which not only imparts increased motion to the material particles directly by sonic waves, but will also effect sympathetic vibrations in the walls of the enclosure or hopper thus imparting direct mechanical vibrations to the material particles.

It is a further object of the present invention to provide a safety cutoff valve means which will prevent a sonic generator positioned within a material hopper from being actuated automatically when the sonic generator or its related equipment is being investigated by an operator.

Figure 1:
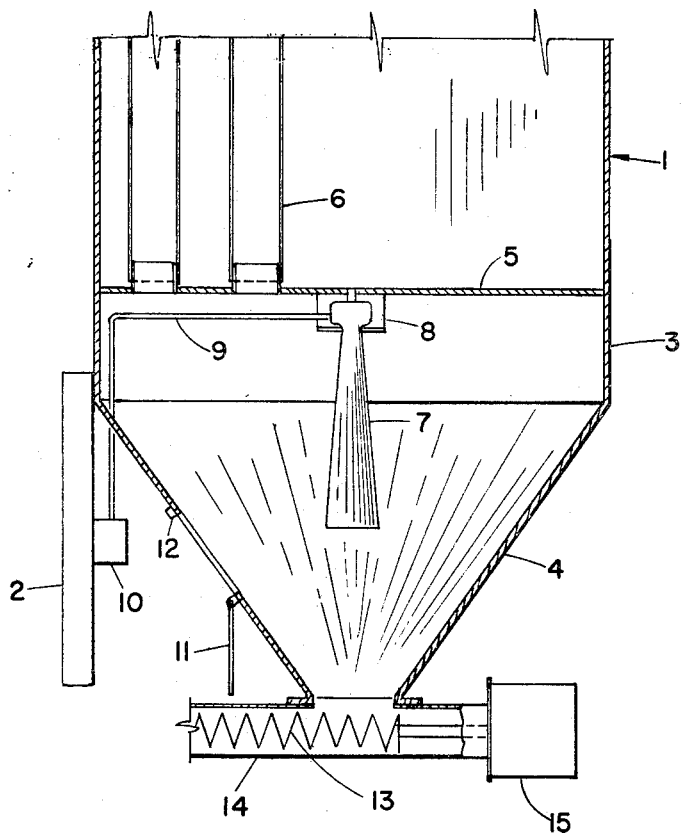
FIGURE 1 is a side elevational view, partly broken and in section, showing the present invention as installed within a dust collector bag housing.
Figure 3:
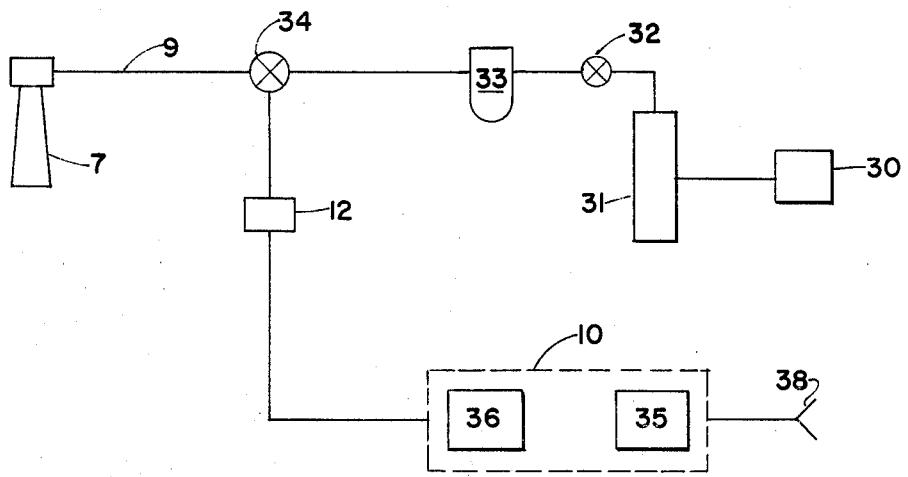
FIGURE 3 is a schematic view of the electrical and pneumatic circuit of the present invention.

In FIGURE 1 there is shown a dust collector bag housing designated generally by numeral 1, which is supported by suitable support means 2. The bag housing consists of an upper portion 3 and a lower portion constituted by a hopper 4. The upper portion 3 is preferably cylindrical, whereas the hopper is conical in shape. Of course, the upper portion 3, may be of other shapes and the hopper would be shaped similarly, but preferably always being of some generally pyramidal shape. Extending across the width of the upper portion 3 is a perforated plate 5 to which is attached upwardly extending filter bags 6, or other suitable filtering media. A sonic generator 7, or horn, is fixed to the plate 5 by means of a bracket 8 and extends downwardly therefrom. An air pressure line 9 leads to the actuating portion of the horn, which is described in greater detail below, from a suitable source of pressurized air which is also described more fully below. A sonic pulse control and timing mechanism 10 controls the flow of air through the line 9 to the horn and and may be fixed to the support means 2 as shown. The control and timing means is shown and described in connection with FIG. 3. In the wall structure of the hopper 4 there is provided an access door 11, which provides ingress and egress to the interior of the hopper. A safety relay switch 12, which is also shown and described in connection with FIG. 3, is attached to the walls of the hopper 4 in a position relative to that of the access door 11 so that when the access door is opened the switch 12 will be actuated and will open the circuit of control means 10 thus preventing actuation of the horn 7. At the outlet of the hopper there is provided conventional material conveying means shown generally as a rotatable screw 13 positioned within a conveying line 14 in the region of the hopper outlet and actuated by a motor 15.

Figure 2:
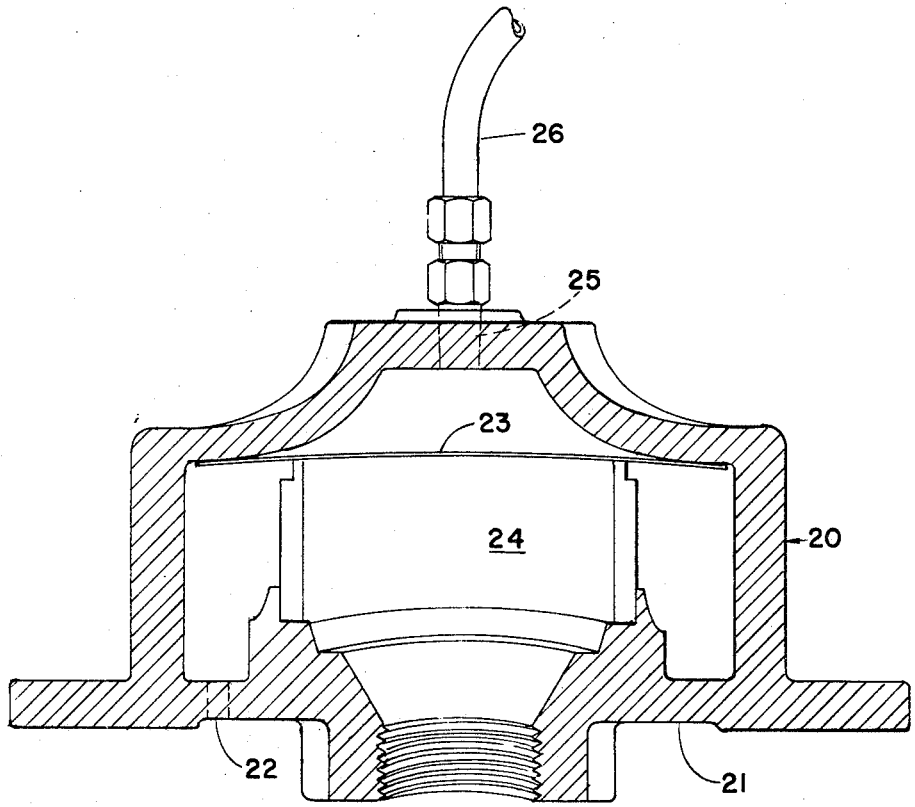
FIGURE 2 is an enlarged elevational view in cross section showing the operating portion of the sonic generator per se.

In FIG. 2 there is shown the valve head portion of the horn. Preferably, the valve head portion designated generally by the numeral 20, consists of a housing 21 having an air inlet portion 22. Within the housing 21 there is a vibrating reed 23 which lies across a cylindrical member 24. The diaphragm 23 is preferably of stainless steel construction in order to withstand high frequency and high amplitude. At the other end of the housing 21 and positioned above the diaphragm 23 there is an air outlet 25 leading to an outlet tube 26. Air coming to the horn through inlet 22 flexes the reed setting up sonic vibrations and exits to the funnel portion of the horn shown in FIG. 1. It has been found that it is best to operate the horn at a frequency ranging from 150 c.p.s. to 250 c.p.s. and at an amplitude of 60 decibels to 180 decibels.

In FIG. 3 there is schematically shown the electrical and pneumatic circuitry of the present invention. Air pressure is provided to the horn 7 by means of a reciprocating type blower 30 which conveys air to a storage tank 31 and thence in successive order through a shutoff valve 32, a filter 33, a solenoid valve 34 and thence through line 9 which leads directly to the valve head portion of the horn as explained above. It is desirable that the blower be capable of producing a line pressure of 50 to 100 p.s.i.a. Actuation of the solenoid valve is controlled by means of a pulse timer 35, a time relay 36 and a safety relay switch 12. The pulse timer 35, and time relay 36 are shown as being incorporated in the same black box 10 which is also shown in FIG. 1. These electrical members are energized by a suitable 115 volt, 60 cycle, source 38. It is preferred that the air pressure supplied by blower 30 be in the order of 75 to 100 p.s.i.g.

The two members 35 and 36 are preset to actuate the horn at predetermined time intervals and at a predetermined pulse cycle between each time interval. For example, it has been found advantageous to automatically activate the horn at 15 min. intervals and to provide 30 seconds between intervals for actuation of the horn. During this 30 seconds it is desirable to have three 5 second blasts of the horn with 5 seconds between each blast. Member 35 controls the 15 minute time intervals between the horn pulses, whereas member 36 controls the 5 second pulse pattern. Depending on the material being conveyed from the hopper and its properties, it may be desirable to change the pulse pattern. It has been found that pulses of greater than 5 seconds duration and sometimes those of more than 3 seconds duration may cause the material to pack along the walls of the hopper despite the vibration which is imparted to the hopper walls by the sonic waves.

The safety relay switch 12 is included in the electrical circuit for the purpose of preventing actuation of the horn when an individual may be investigating the dust collector. As shown and described in connection with FIG. 1 above, the relay switch 12 is positioned relative to the access door 11 in such a manner as when the door is in its opened position the relay switch will be in an open position thus interrupting the circuit by the horn solenoid valve 34 and the timing and control means 10.

The operation of the present invention is considered clear in view of the above detailed description of the preferred embodiment and preferred operating cycle.

As this invention may be embodied in several forms without departing from the spirit thereof, the present embodiment is intended to be illustrative and not restrictive, and the scope of the invention is considered defined by the lawful scope of the appended claims rather than by the description preceding them.

I claim:
1. In combination, an enclosure means having an inlet portion and an outlet portion through which fine granular material is to be gravity conveyed, a sonic generating means, means for operating said sonic generating means so as to produce a sonic frequency sufficient to dislodge fine granular material bridging across said outlet portion, and amplification means communicating with said sonic generating means and attached thereto at a point below that at which the sonic vibrations are generated, said sonic generating means and amplification means being positioned within the region of said inlet portion at a point below that at which said fine granular material is admitted to the enclosure means and out of the path of flow of said material and adapted to direct sonic vibrations in the direction of and within the region of said outlet portion, whereby said sonic vibrations impart motion to the fine granular material.

2. The combination as defined in claim 1 wherein control means are provided for intermittently actuating said sonic generating means at preselected intervals of time and a preselected pulse pattern.

3. The combination as defined in claim 2 wherein said control means is automatically actuatable and comprises a pulse timer means and a time delay relay means, said pulse timer means actuating said sonic generating means at preselected time intervals and said time delay relay means being controlled by said pulse timer means to actuate said sonic generating means at a preselected pulse pattern between said time intervals, said sonic generating means being actuated by air pressure including a valve means for controlling the flow of air thereto, and said automatic control means controlling the opening and closing of said valve means.

References Cited

UNITED STATES PATENTS

| | | | |
|---|---|---|---|
| 2,824,567 | 2/1958 | Karlstrom | 134—57 |
| 3,212,756 | 10/1965 | Hutton | 259—1 |
| 3,329,311 | 7/1967 | Goff et al. | 222—76 |
| 3,385,522 | 5/1968 | Kock | 239—104 |

ROBERT B. REEVES, Primary Examiner

NORMAN L. STACK, Assistant Examiner

U.S. Cl. X.R.

222—226